US011082498B2

(12) United States Patent
Kwatra et al.

(10) Patent No.: US 11,082,498 B2
(45) Date of Patent: Aug. 3, 2021

(54) METHODS AND SYSTEMS FOR MANAGING MULTI-CHANNEL COMPUTING ENVIRONMENTS TO OPTIMIZE USER EFFICIENCY

(71) Applicant: INTERNATIONAL BUSINESS MACHINES CORPORATION, Armonk, NY (US)

(72) Inventors: Shikhar Kwatra, Durham, NC (US); Jeremy Fox, Georgetown, TX (US); Christopher Hardee, Raleigh, NC (US); Liam Harpur, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 26 days.

(21) Appl. No.: 16/241,726

(22) Filed: Jan. 7, 2019

(65) Prior Publication Data
US 2020/0220933 A1  Jul. 9, 2020

(51) Int. Cl.
*G06F 13/00* (2006.01)
*H04L 29/08* (2006.01)
*G06N 3/08* (2006.01)

(52) U.S. Cl.
CPC ............ *H04L 67/125* (2013.01); *G06N 3/08* (2013.01); *H04L 67/22* (2013.01); *H04L 67/327* (2013.01)

(58) Field of Classification Search
CPC ......... G06F 2203/0381; H04L 65/4007; H04L 65/4015; H04L 29/06394; H04L 29/06401; H04L 29/06088; H04L 69/14; H04L 67/125; H04L 67/327; H04L 67/22; G06N 3/08

USPC ........ 709/240, 238, 226, 225, 227–229, 224
See application file for complete search history.

(56) References Cited

U.S. PATENT DOCUMENTS

| 7,555,559 B2* | 6/2009 | Chapweske | H04L 29/06 709/203 |
| 8,103,786 B2* | 1/2012 | Chapweske | H04L 29/06 709/217 |
| 8,239,515 B2* | 8/2012 | Chapweske | H04L 29/06 709/203 |
| 2008/0301562 A1* | 12/2008 | Berger | G06F 16/958 715/733 |
| 2012/0110140 A1* | 5/2012 | Chapweske | H04L 29/06 709/219 |
| 2013/0086252 A1* | 4/2013 | Cutler | H04M 15/43 709/224 |

(Continued)

FOREIGN PATENT DOCUMENTS

WO    2015047536 A1    9/2013

*Primary Examiner* — Kenneth R Coulter
(74) *Attorney, Agent, or Firm* — Griffiths & Seaton PLLC (57) ABSTRACT

Embodiments for managing a multi-channel computing environment by one or more processors are described. A user simultaneously interacting with a plurality of computing nodes is detected. A computing node prioritization strategy for future user interaction with at least one of the plurality of computing nodes is determined based on at least one data source associated with at least one of the detected user interaction with the plurality of computing nodes and the user. The future user interaction with at least one of the plurality of computing nodes is at least limited based on the determined computing node prioritization strategy.

18 Claims, 7 Drawing Sheets

(56) References Cited

U.S. PATENT DOCUMENTS

| | | | |
|---|---|---|---|
| 2015/0283456 A1* | 10/2015 | Chan | A63F 13/12 |
| | | | 463/43 |
| 2015/0283462 A1* | 10/2015 | Chan | H04L 67/2847 |
| | | | 709/203 |
| 2016/0062635 A1 | 3/2016 | Feit et al. | |
| 2018/0174070 A1 | 6/2018 | Hoffman et al. | |
| 2018/0196695 A1 | 7/2018 | Du et al. | |

* cited by examiner

| INTERACTION CHARACTERISTIC | STATE 1 | STATE 2 |
|---|---|---|
| USER A RESPONSIVE TO USER B | .6 | .3 |
| RESULTING TONE BETWEEN USER A AND USER B | .5 | .2 |
| OVER ALL TIME USED | .5 | .4 |
| USER CHURN/LOYALTY | .7 | .6 |

METHODS AND SYSTEMS FOR MANAGING MULTI-CHANNEL COMPUTING ENVIRONMENTS TO OPTIMIZE USER EFFICIENCY

BACKGROUND OF THE INVENTION

Field of the Invention

The present invention relates in general to computing systems, and more particularly, to various embodiments for managing multi-channel computing environments to, for example, optimize user efficiency.

Description of the Related Art

When computing system users interact with (or work in, experience, etc.) multi-channel environments (e.g., the user is simultaneously using/interacting with more than one computing channel, node, application, etc.), the user's overall efficiency, or at least their efficiency with respect to particular channels, is often decreased. That is, users' efficiency often degrades when attempting to simultaneously interact with multiple channels/nodes compared to when they are interacting with only one computing channel/node at a time, perhaps depending on the channels in question.

For example, a particular user may be able to simultaneously interact with a first channel and a second channel without significantly affecting efficiency. However, the same user may experience significant efficiency degradation when attempting to simultaneously interact with the first channel and a third channel. In some instances, users may spend a significant amount of time inefficiently multi-tasking and/or attempting to develop or learn efficient coping strategies.

SUMMARY OF THE INVENTION

Various embodiments for managing multi-channel computing environments by one or more processors are described. In one embodiment, by way of example only, a method for managing a multi-channel computing environment, again by one or more processors, is provided. A user simultaneously interacting with a plurality of computing nodes is detected. A computing node prioritization strategy for future user interaction with at least one of the plurality of computing nodes is determined based on at least one data source associated with at least one of the detected user interaction with the plurality of computing nodes and the user. The future user interaction with at least one of the plurality of computing nodes is at least limited based on the determined computing node prioritization strategy

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, when computing system users interact with (or work in, experience, etc.) multi-channel environments (e.g., the user is simultaneously using/interacting with more than one computing channel, node, application, etc.), the user's overall efficiency, or at least their efficiency with respect to particular channels, is often decreased. That is, users' efficiency often degrades when attempting to simultaneously interact with multiple channels/nodes compared to when they are interacting with only one computing channel/node at a time, perhaps depending on the channels in question.

For example, a particular user may be able to simultaneously interact with a first channel and a second channel without significantly affecting efficiency. However, the same user may experience significant efficiency degradation when attempting to simultaneously interact with the first channel and a third channel.

As a specific example, consider a scenario in which a user often utilizes a work space application (e.g., a collaborative software development application), a virtual (or online) meeting application (or service), and a text-based messaging application. Although the user may be able to simultaneously interact with the software development application and the virtual meeting application in a relatively efficient manner (e.g., with respect to one or both of those applications), the user's efficiency may be significantly reduced when they interact with the software development application and the messaging application at the same time (and/or all three applications at the same time).

For some users, such instances may occur multiple times over the course of a single day and lead to the user often spending their time inefficiently multi-tasking. In some instances, users may spend a significant amount of time attempting to develop or learn efficient coping strategies, which often do little to improve efficiency.

Although some solutions may help the user by, for example, filtering messages from other users (e.g., received through various channels), current systems do little, if anything, with respect to understanding the user's cross-platform or multi-channel efficiency, correlating the user's current state with previous interactions with multi-channel environments, and applying a prioritization model for the various channels (e.g., nodes, applications, devices, etc.).

To address these needs, in some embodiments, the methods and systems described herein monitor (and/or learn) the user's interaction (e.g., responses, reactions, etc.) in a multi-channel computing environment in to, for example, determine the priority, frequency, and timing of the user's actions with respect to the different channels (or nodes, applications, etc.).

In some embodiments, the methods and system manage the environment by, for example, at least limiting the user's interaction with (or use of) at least some of the channels (e.g., at a later time). For example, depending on the observed behavior and/or data collected/retrieved from various sources associated with the user, the system may (e.g., during future or subsequent interaction with the environment) prevent the user from interacting with particular channels when other channels are in use or limit the frequency with which the user may interact with the some of the channels in order to, for example, improve the overall efficiency of the user (i.e., at least with respect to some of the channels). Continued monitoring of the user (and/or the user's interaction with the environment/channels) and/or feedback from the user may be utilized to determine if additional changes to the management of the environment should be made and/or if the user would benefit from additional changes.

The methods and systems described herein may be particularly beneficial for projects and/or in environments in which users are collaborating or working together on tasks, projects, objectives (e.g., employees working together on a project, social groups, etc.). Such groups may benefit from being highly dynamic in nature in order to accomplish certain tasks to provide clear value. Individuals in such groups may need to be able to respond appropriately to social interactions (e.g., received communications/messages) based on user or group efficiency. Embodiments described herein may provide dynamic management of such issues.

In some embodiments, the methods and systems described herein may help establish necessary (or at least useful) temporal baselines and triggering mechanisms for short-term social group dynamics based on, for example, relative priorities within groups. As such, the methods and systems may allow for significant improvement in cost (or time) for users' collaboration and management of channels (e.g., applications, tools, etc.) within groups. The methods and system may be utilized to monitor dynamic, time sensitive interactions for all of the groups with which the individual users are involved and greatly improve the accuracy and quantity of potential collaboration between a user and their groups (or other users within their groups).

In some embodiments, the data used to manage the computing environment(s) includes information related to a user's interaction with one or more channels in a computing environment, such as the user's interaction with devices/nodes channel (or application) or notification content, as described in greater detail below. Other data sources that may (also) be used include, for example, data collected by sensors (e.g., cameras, wearable devices, etc.), geo-spatial and temporal data, and calendar (or schedule) data.

However, it should be understood that the methods and systems described herein may utilize any data (or data sources) associated with the user and/or the user's interaction with the computing environment(s) (and/or other users and/or the other users' interaction with the computing environment(s)) that are accessible by the system (perhaps with the permission or authorization of the user and/or an administrator). For example, in some embodiments, a profile (e.g., a cognitive profile) for the user(s) may be generated. Data sources that may be use used to generate a cognitive profile for the user(s) may include any appropriate data sources associated with the user that are accessible by the system. Examples of such data sources include, but are not limited to, communication sessions and/or the content (or communications) thereof (e.g., phone calls, video calls, text messaging, emails, in person/face-to-face conversations, etc.), a profile of (or basic information about) the user (e.g., job title, place of work, length of time at current position, family role, use preferences, etc.), a schedule or calendar (i.e., the items listed thereon, time frames, etc.), projects (e.g., past, current, or future work-related projects), location (e.g., previous and/or current location and/or location relative to other users), social media activity (e.g., posts, reactions, comments, groups, etc.), browsing history (e.g., web pages visited), and online purchases.

In some embodiments, some of the data utilized is detected by sensors, such as cameras, microphones, biometric sensors, motion sensors, and wireless transceivers (e.g., wireless communications to detect the presence of computing devices). The sensor(s) may be integrated into a computing device associated with the computing environment (e.g., a desktop PC or laptop computer) or another computing device (e.g., a wearable device, such as a smart watch) and/or separate from such devices (e.g., security cameras).

In some embodiments, the methods and systems described herein utilize a cognitive analysis that is performed on the available data sources. The cognitive analysis may include classifying natural language, analyzing tone, and analyzing sentiment (e.g., scanning for keywords, key phrases, etc.) with respect to, for example, communications sent and/or received by the users and/or other available data sources. In some embodiments, natural language processing (NLP), Mel-frequency cepstral coefficients (MFCCs), and/or region-based convolutional neural network (R-CNN) pixel mapping (e.g., for images/videos), as are commonly understood, are used.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the management of computing environments as described herein. Utilizing the models, the performance (or operation) of the system (e.g., utilizing/based on new inputs) may be predicted and/or the performance of the system may be optimized by investigating how changes in the input(s) effect the output(s). Over time, the methods and systems described herein may determine correlations (or insights) between users' interaction with the computing environments (or at least some channels utilized therethrough), perhaps with feedback provided by the users, that allow for the performance of the system to improve with continued use.

It should be understood that as used herein, the terms "computing node" (or simply "node") and/or "channel" may refer to a computing device, such as a mobile electronic device or a desktop computer, and/or an application, such a work space application, a messaging application, a virtual meeting application, a chatbot, an email application, a social media application, a web browser, etc. In other words, as used herein, examples of computing nodes (and/or channels) include, for example, computing devices such as mobile phones, tablet devices, desktop computers, or other devices, such as appliances (IoT appliances) that are owned and/or otherwise associated with individuals (or users), and/or various applications that are utilized by the individuals on such computing devices.

In particular, in some embodiments, a method for managing a multi-channel computing environment by one or more processors is provided. A user simultaneously interacting with a plurality of computing nodes is detected. A computing node prioritization strategy for future user interaction with at least one of the plurality of computing nodes is determined based on at least one data source associated with at least one of the detected user interaction with the plurality of computing nodes and the user. The future user interaction with at least one of the plurality of computing nodes is at least limited based on the determined computing node prioritization strategy.

The determining of the computing node prioritization strategy may be performed utilizing a cognitive analysis. The determining of the computing node prioritization strategy may include calculating an interaction score for the detected user interaction with at least one of the plurality of computing nodes.

The at least one data source associated with at least one of the detected user interaction with the plurality of computing nodes and the user may include data collected by sensors during the detected user interaction with the plurality of computing nodes. The at least one data source associated with at least one of the detected user interaction with the plurality of computing nodes and the user may include at least one of electronic communications associated with the detected user interaction with the plurality of computing nodes and a schedule of the user.

The at least limiting the future user interaction with the at least one of the plurality of computing nodes based on the determined computing node prioritization strategy may include preventing the user from interacting with the at least one of the plurality of computing nodes while the user is interacting with others of the plurality of computing nodes. Each of the plurality of computing nodes may include at least one of a computing device and a software application.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
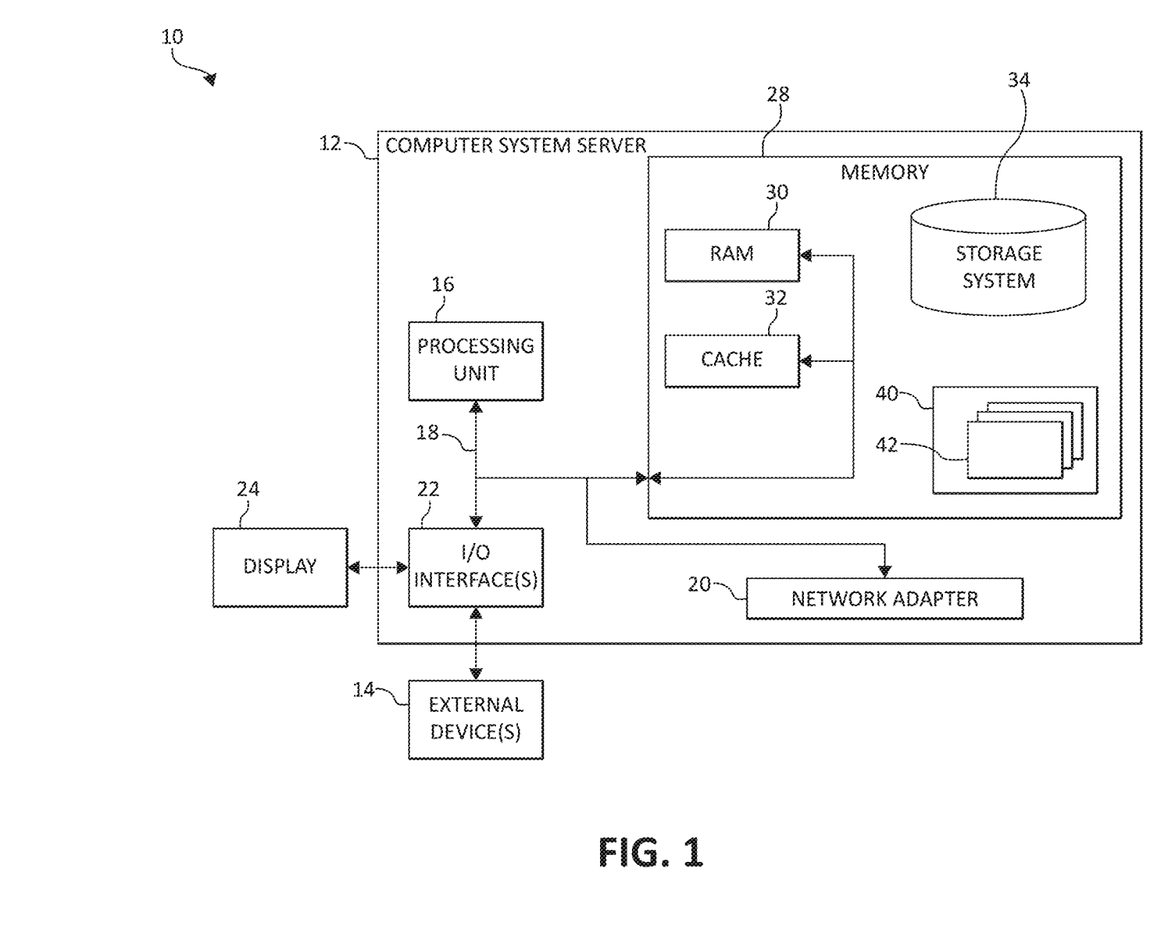
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems (e.g., desktop PCs), server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
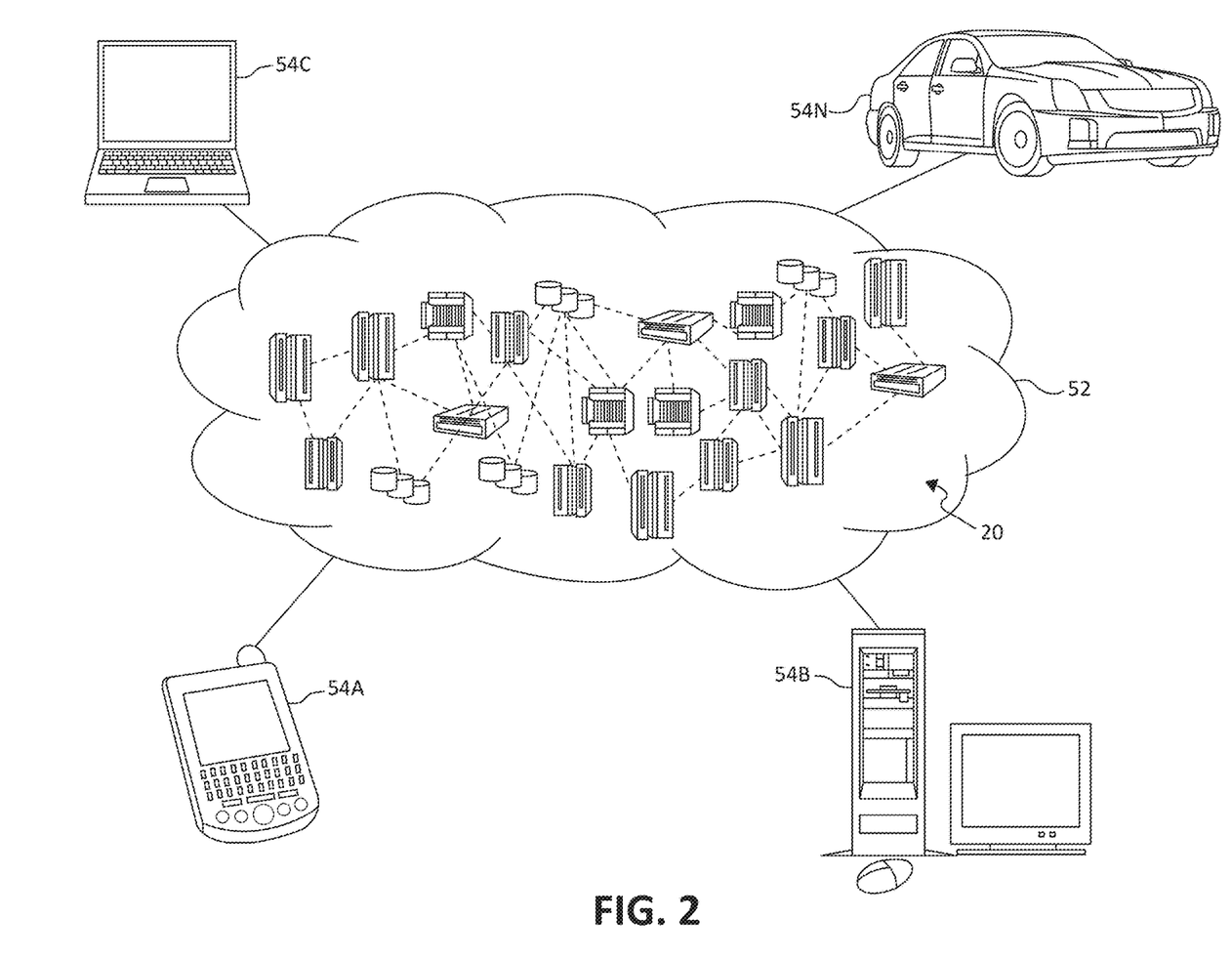
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N, may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
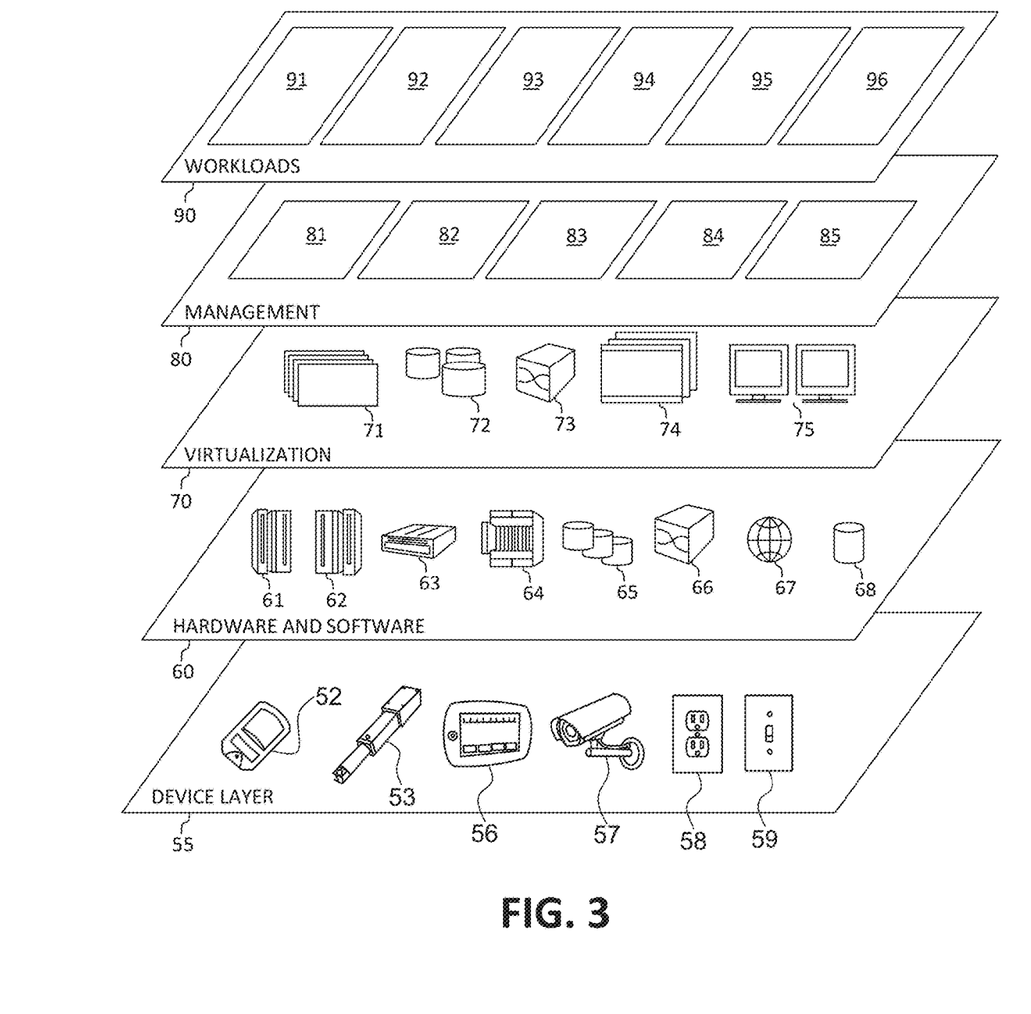
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing computing environments (and/or the operation thereof) as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, the methods and systems described herein monitor (and/or learn) the user's interaction (e.g., responses, reactions, etc.) in a multi-channel computing environment to, for example, determine the priority, frequency, and timing of the user's actions with respect to the different channels (or nodes, applications, etc.). In some embodiments, the methods and system manage the environment by, for example, at least limiting the user's interaction with (or use of) at least some of the channels (e.g., at a later time). For example, depending on the observed behavior and/or data collected/retrieved from various sources associated with the user, the system may (e.g., during future or subsequent interaction with the environment) prevent the user from interacting with (or using) particular channels (or at least particular aspects of functionality of those channels) when other channels are in use or limit the frequency with which the user may interact with the some of the channels in order to, for example, improve the overall efficiency of the user (i.e., at least with respect to some of the channels). Continued monitoring of the user (and/or the user's interaction with the environment/channels) and/or feedback from the user may be utilized to determine if additional changes to the management of the environment should be made and/or if the user would benefit from additional changes.

In some embodiments, the system monitors (or detects) a user interacting with at least one channel (e.g., application, computing node, etc.) of a multi-channel computing environment (or system). For example, the user may interact with (or utilize) the computing environment in multiple "states." A first state may include the user using only a first channel (e.g., a first application), and a second state may include the user simultaneously using (or interacting with) the first channel and a second channel (e.g., a second application). Additional states (e.g., third, fourth, etc. states) may be monitored in which the user simultaneously interacts with additional channels (e.g., third, fourth, etc. applications). In some embodiments, the user may interact with multiple channels on a single computing device (e.g., a desktop PC). However, it should be understood that the methods and systems described herein may also be applied to situations in which the user is simultaneously using multiple computing devices (e.g., a first application on a desktop PC and a second application on a laptop computer).

In some embodiments, as the user interacts with the different channels in the different states, the "behavior" (e.g., efficiency, interaction patterns, timing, delays in responding to other users, etc.) exhibited by the user may change. In particular, the manner in which the user interacts with the different channels may vary depending on how many channels they are interacting with (or trying to interact with) at the same time. For example, the user may be able to simultaneously interact with a software development application and a virtual meeting application in a relatively efficient manner. That is, the user's efficiency with respect to either application may not significantly change regardless of whether or not the user is interacting with those applications individually or at the same time. However, the user's efficiency may be significantly reduced when they interact with the software development application and a messaging application at the same time (and/or all three applications at the same time). That is, the user's efficiency with respect to either application may significantly change when they are interacting with both applications at the same time compared to when the user interacts with the applications individually.

In some embodiments, relevant information about the user's interaction (e.g., interaction with the different channels, behavior, etc.) is parsed into a parser engine, which may be utilized as an input parameter for a learning model. The information related to the user's interaction may be taken from (or associated with) the user's interaction with other users who may be interacting with the user through the computing environment and/or at least some of the channels. The information may be divided among the different states of user interaction (as described above) and different interaction characteristics (e.g., the user's interaction with other users).

Figure 4:
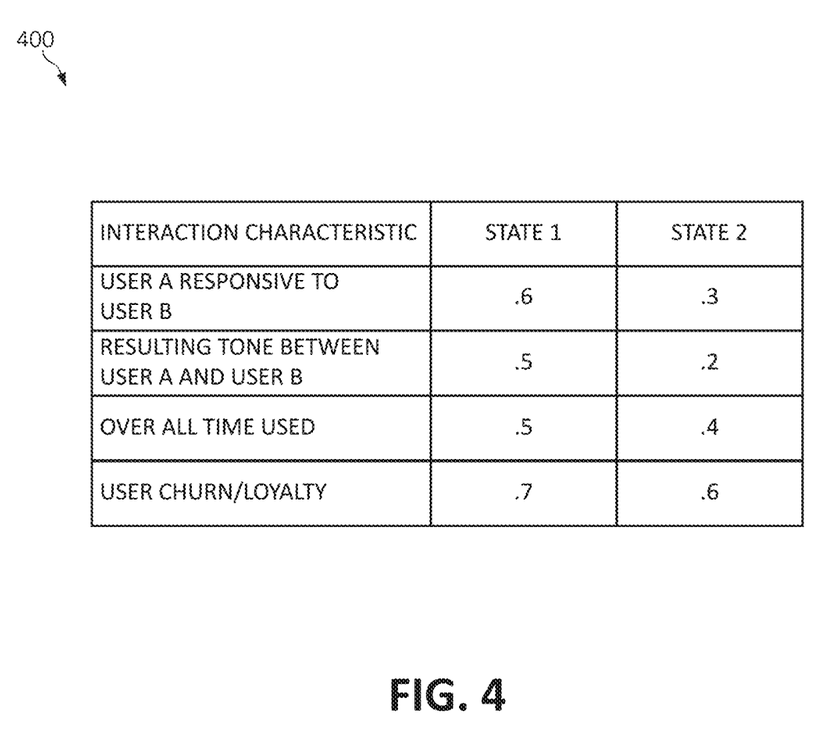
FIG. 4 is a table of scores for various aspects of a user's interaction with a multi-channel computing environment according to an embodiment of the present invention.

For example, FIG. 4 illustrates a table 400 of an exemplary set of information (or data) related to a user's (e.g., User A) behavior as it relates to interacting with another user (e.g., User B) through a computing environment, or more specifically, two applications utilized (e.g., by User A and User B) in the computing environment. As shown, the table 400 includes three columns, one listing interaction characteristics (or aspects of interaction) and the other two listing scores (or grades) for User A's behavior or interaction in a first state (e.g., State 1) of the computing environment and a second state (e.g., State 2) of the computing environment. As an example, the first state may be associated with User A interacting with only one application, such as a virtual meeting application, and the second state may be associated with User A simultaneously interacting with two applications, such as the virtual meeting application and a messaging application. In the example shown, the interaction characteristics include User A's responsiveness to User B, the tone (e.g., of communications) between User A and User B, overall time used (e.g., overall time used one of the applications), and user churn/loyalty (e.g., whether or not the user continues to use the application). An application programming interface (API) may be used to identify or extract the interaction information, which is parsed for topic and timing over a period of time. The assigned scores may be normalized. As shown, User A's behavior changes significantly when they are interacting with both applications at the same time.

In some embodiments, the system utilizes a deep learning neural network (DLNN) to perform the management of computing environments (e.g., the setting of the priority of tools/applications, the frequency of the use of the tools/applications, etc.) described herein. In some embodiments, the system utilizes, for example, sensor data, geo-spatial and temporal monitoring, calendar information, user interaction with devices, and application content as input features.

The sensor data (or feeds) may include data that is collected by various sensors (e.g., IoT sensors), such as cameras, microphones, biometric sensors (e.g., on wearable devices), and any other sensors in a suitable proximity to monitor the user. For example, cameras may be utilized for gaze detection (e.g., determining where the user is looking), facial recognition, and mood detection. Biometric sensors, such as heart rate and blood pressure monitors, on wearable devices (e.g., smart watches) may also be utilized (e.g., to determine mood, stress levels, etc.). Using principal component analysis, the system may be able develop a multi-dimensional user personality and mood matrix into a one dimensional feature set for the user.

The geo-spatial and temporal monitoring may be utilized to determine the location (e.g., via GPS or wireless communication between computing devices) and the time of day in order to, for example, understand the user's time-based priority, which may be used to increase confidence levels. The calendar information may include information from the user's calendar (or schedule), such as meetings, projects, events, etc. The user interaction with devices may include data related to how (and/or when) the user responds to content (e.g., communications from other users) that are rendered on different devices, such as desktop PCs, laptop computers, tablet devices, mobile phones, etc. (i.e., in embodiments in which the computing environment utilizes multiple devices). The application content may include semantic and syntactic content information of application content and notifications (e.g., communications from other users), which may be extracted using, for example, a NLP parser engine and sentence Convolutional Neural Network (CNN) to extract relevant keywords and key phrases in the content that may then be correlated with the user's reactions.

The above input features may be utilized to determine the pattern history of the user, and may be fed into a second layer of the neural network, which includes the user's actions/behavior (e.g., using applications/channels, reading particular notifications, attending particular events, the user's location, etc.). These features may be fed into a third (e.g., the final) layer of the neural network.

The final layer may include (or determine) an action or application prioritization strategy (or a computing node prioritization strategy). The prioritization strategy may include limiting future user interaction with at least one of the channels (e.g., over a particular time period (T)). For example, the system may prevent the user from interacting with (or using) particular channels when other channels are in use (e.g., by deactivating/blocking the channel, disabling particular aspects of functionality of the channel, etc.) or limit the frequency with which the user may interact with the some of the channels in order to, for example, improve the overall efficiency of the user (i.e., at least with respect to some of the channels). In some embodiments, the prioritization strategy is automatically implemented by the computing environment (or by a control system thereof). However, in some embodiments, the implementation of the prioritization strategy may be controlled by the user or an administrator. In some embodiments, a notification of the prioritization strategy may be generated and provided to appropriate personnel (e.g., an electronic message, such as an email, sent to the user and/or an administrator). As such, in some embodiments, the prioritization strategy may be provided as a suggestion to the user and/or another individual to improve efficiency.

In some embodiments, iterative processing is used such that the prioritization strategy is continuously updated or changed based on, for example, the user's behavior and/or changes in the user's behavior in response to a previous prioritization strategy. Additionally, user feedback (e.g., user reactions or explicit feedback) may be utilized.

In some embodiments, weights applied to the input parameters of the model may be adjusted based on individual user's reactions (and/or explicitly provided feedback) to change the priority of the input parameters (i.e., which may be assessments of the cognitive heuristics of the user). Preferences and/or the input parameters may be weighted differently based on personal preferences of pre-set configurations. In some embodiments, the system may utilize the prioritization strategies and/or adjustments made with respect to other users (e.g., via "crowdsourcing" if the system identifies similarities between the user and others).

Figure 5:
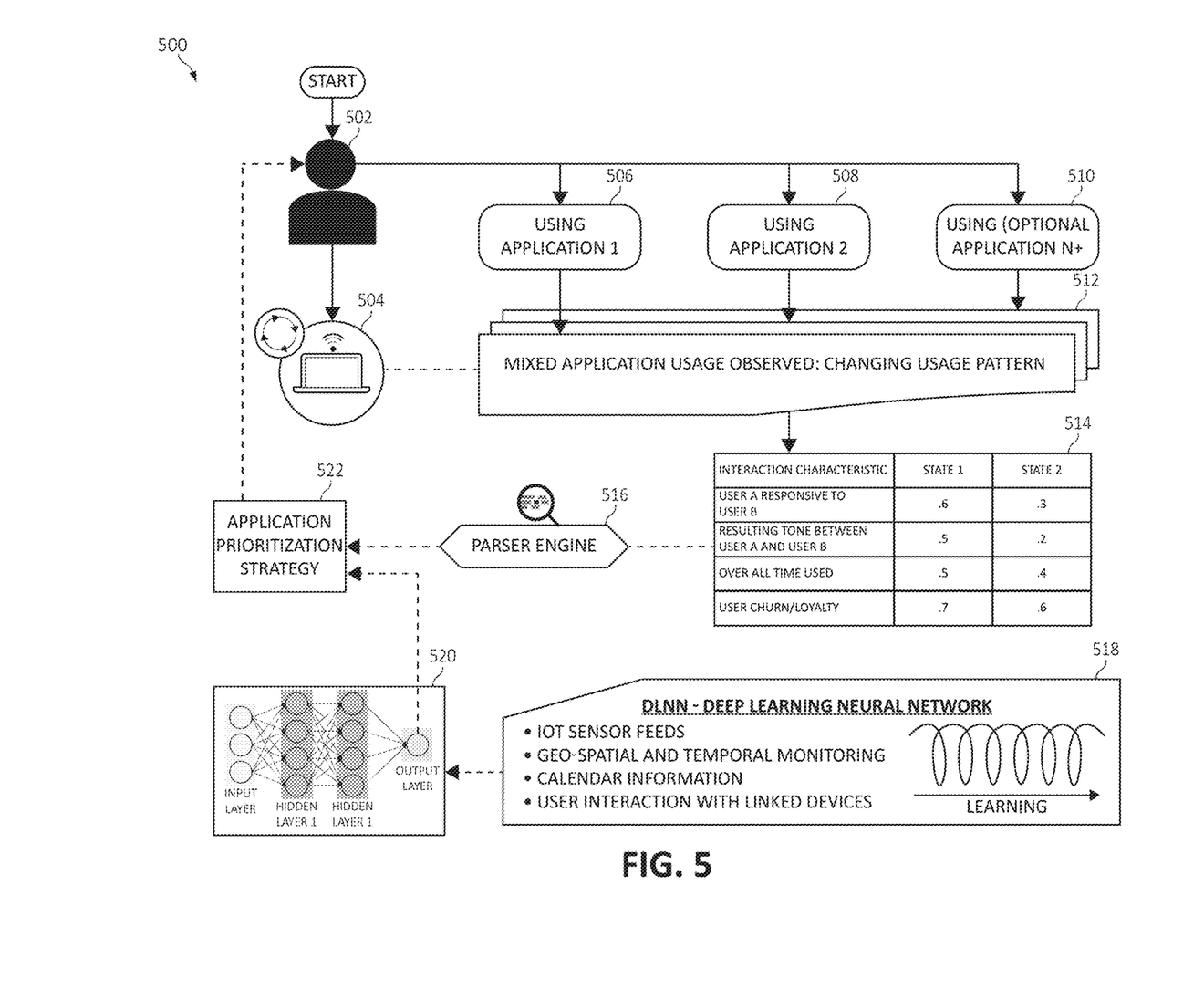
FIG. 5 is a block diagram/flow chart of a system and/or method for managing a computing environment according to an embodiment of the present invention.

FIG. 5 illustrates a block diagram of a system (and/or method) 500 for managing a computing environment (e.g., a multi-channel computing environment) according to an embodiment of the present invention. A user 502 interacts with a computing environment (or system) using (at least one) computing device 504. In particular, the user 502 interacts with multiple computing channels (or nodes) 506-510 via the computing device 504 (e.g., Application 1, Application 2, Application N+, etc.). At block 512, the user's 502 behavior or interaction with the different channels, or more particular, the changes in the user's 502 usage pattern, is observed as the user's interacts with the computing environment in different states (e.g., State 1, State 2, etc.). As described above, the different states may refer to the user interacting with different combinations of the channels at the same time (e.g., only interacting with Application 1, simultaneously interacting with Application 1 and Application 2, etc.).

At block 514, scores for various characteristics of the user's interaction with the computing environment and/or the channels are determined (or calculated), as described above (e.g., with respect to FIG. 4). At block 516, the scores are fed into a parser engine. At block 518, input data for a DLNN 520 is collected (or monitored). In some embodiments, the input data includes sensor data, geo-spatial and temporal monitoring, calendar information, user interaction with devices, and application content as input features, as described above. The input data is provided to the DLNN (e.g., into an input layer of the DLNN). In the depicted embodiment, output from the DLNN (e.g., from an output layer of the DLNN) is utilized, along with the output from the parser engine 516, to determine an application (or channel, computing node, etc.) prioritization strategy 522.

Figure 6:
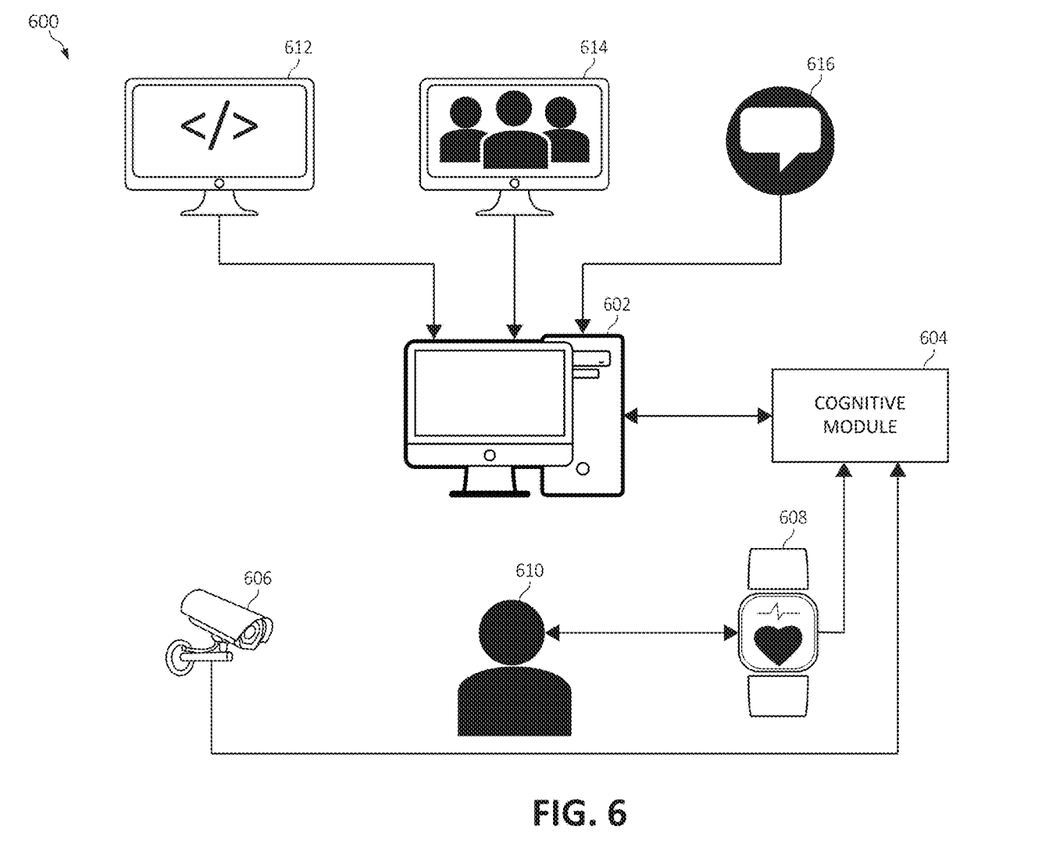
FIG. 6 is a simplified block diagram of a computing environment according to an embodiment of the present invention.

FIG. 6 illustrates an exemplary computing environment (or system) 600 according to some embodiments of the present invention. The computing environment 600 includes a computing device 602, a cognitive module 604, at least one sensor 606, and a wearable device 608. The computing device 602 may be any suitable computing device through which a user 610 may interact with or use computing environment channels. In the depicted embodiment, the computing device 602 is a desktop PC. However, in other embodiments, the computing device 602 may be (or include) other devices, such as laptop computers, mobile phones, tablet devices, etc. Also, as described above, although only one computing device 602 is shown in FIG. 6, in some embodiments, the methods and system described herein may be applied to computing environments in which the user(s) 610 utilizes multiple devices (e.g., a desktop PC and a laptop computer).

The cognitive module (or control system) 604 may include (and/or be implemented with) any suitable computing device or system, such as those described above, and may be configured to perform the management of computing environments and/or any associated cognitive analysis, as described herein. The cognitive module 604 may be in operable communication with the computing device 602 (and/or applications, channels, etc. utilized by the computing device 602), the sensor 606, and the wearable device 608. Although the cognitive module 604 is shown as a separate component in FIG. 6, it should be understood that in some embodiments the cognitive module 502 may be integrated into another computing device (e.g., the computing device 602 or a remote device/server).

The sensor 606 may include any suitable sensor that is capable of monitoring the user 610, as described above. In some embodiments, the sensor 606 includes a camera and/or a microphone. The wearable device 608 may be any suitable wearable technology device, such as a smart watch, that may be utilized to perform additional monitoring of the user 610. For example, the wearable device 608 may include, for example, a heart rate and/or blood pressure monitor. In some embodiments, the sensor 606 and/or the wearable device 608 may not be included or utilized.

In some embodiments, the system (e.g., the cognitive module 604) monitors the user 610 as they interact with one or more computing channel (e.g., application) via the computing device 602. In the depicted embodiment, the channels (or applications) include a (collaborative) software development application 612, a virtual meeting application 614, and a messaging application 616. In some embodiments, the user 610 utilizes the channels 612-616 in different states, which each state corresponding to the user interacting with a different combination of the channels 612-614 (e.g., interacting with only the software development application 612, interacting with both the software development application 612 and the virtual meeting application 614 at the same time, etc.). The cognitive module 604 may receive (or retrieve) various types of data from the computing device 602 and/or the channels 612-616 related to the user's behavior or interaction with the channels 612-616, as described above. Additionally, the cognitive module 604 may utilize data collected from the sensor 606 and/or the wearable device 608, as described above. The received data may be utilized to perform the management of the computing environment 600 (e.g., limiting the user's future/subsequent interaction with at least some of the channels 612-616), as described herein.

Figure 7:
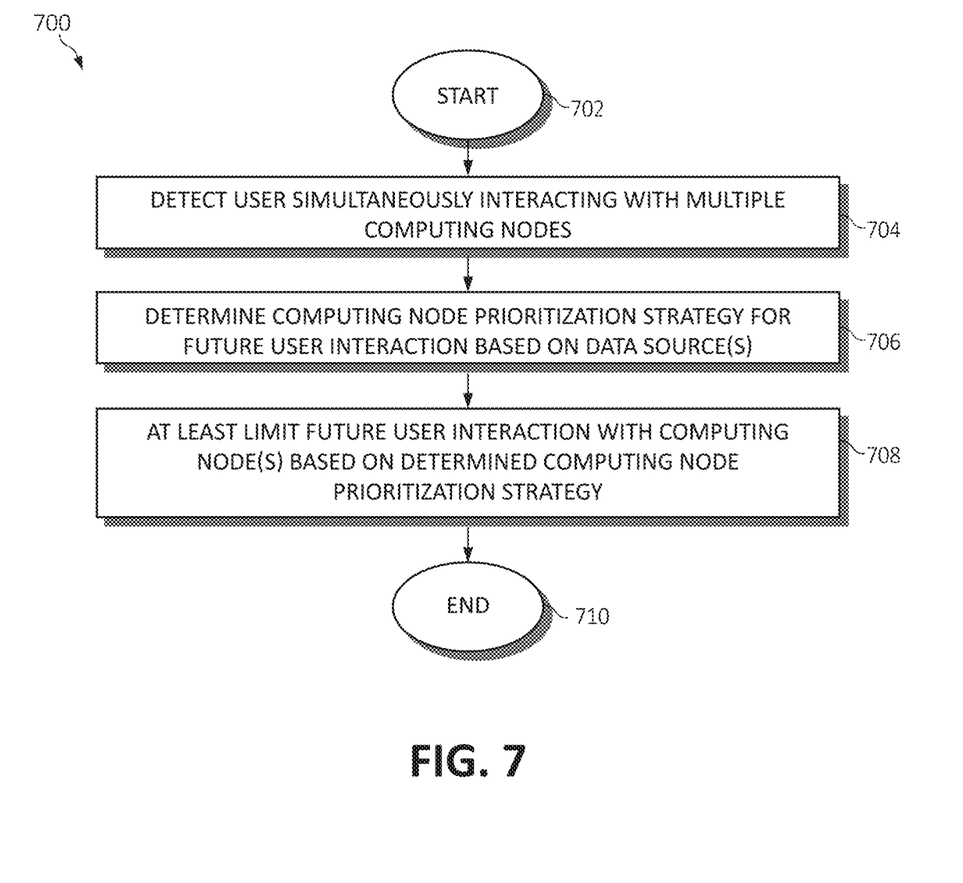
FIG. 7 is a flowchart diagram of an exemplary method for managing a computing environment according to an embodiment of the present invention.

Turning to FIG. 7, a flowchart diagram of an exemplary method 700 for managing (or controlling) a computing environment (e.g., a multi-channel computing environment), in accordance with various aspects of the present invention, is provided. Method 700 begins (step 702) with, for example, a user beginning to interact with a computing environment, such as via one or more computing devices (e.g., a desktop PC, laptop computer, etc.) that is configured to utilize more than one computing node or channel (e.g., more than one application, etc.).

The user simultaneously interacting with a plurality of (or at least one) computing nodes is detected (step 704). Each of the plurality of computing nodes may include at least one of a computing device and a software application.

A computing node prioritization strategy for future (or subsequent) user interaction with at least one of the plurality of computing nodes is determined based on at least one data source associated with at least one of the detected user interaction with the plurality of computing nodes and the user (step 706). The determining of the computing node prioritization strategy may be performed utilizing a cognitive analysis. The determining of the computing node prioritization strategy may include calculating an interaction score for the detected user interaction with at least one of the plurality of computing nodes. The at least one data source associated with at least one of the detected user interaction with the plurality of computing nodes and the user may include data collected by sensors during the detected user interaction with the plurality of computing nodes, at least one of electronic communications associated with the detected user interaction with the plurality of computing nodes, and/or a schedule of the user.

The future user interaction with at least one of the plurality of computing nodes is at least limited based on the determined computing node prioritization strategy (step 708). For example, when the user utilizes the computing environment at a later or subsequent time, they may be prevented from interacting with at least some of the computing nodes while interacting with others of the computing nodes and/or the frequency with which the user may interact with the computing nodes may be limited. In some embodiments, a notification of the determined computing node prioritization strategy is provided to the user and/or another individual (e.g., via an email, text message, pop-up window on the computing device, etc.).

Method 700 ends (step 710) with, for example, feedback being received from the user(s). The feedback may be collected by monitoring the reactions, behavior, etc. of the user and/or via explicit feedback. The feedback may be utilized to tune and/or improve performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing a multi-channel computing environment comprising:
    detecting a user simultaneously interacting with a plurality of computing nodes, wherein each of the plurality of computing nodes comprises a computer program application different from one another such that the detecting identifies the user as simultaneously physically interacting with a plurality of differing computer program applications notwithstanding whether any of the plurality of differing computer program applications are executed on a same computing device;
    determining a computing node prioritization strategy for future user interaction with at least one of the plurality of computing nodes based on at least one data source associated with at least one of said detected simultaneous user interaction with the plurality of computing nodes and the user; and
    at least limiting the future user interaction with at least one of the plurality of computing nodes based on the determined computing node prioritization strategy.

2. The method of claim 1, wherein the determining of the computing node prioritization strategy is performed utilizing a cognitive analysis.

3. The method of claim 1, wherein the at least one data source associated with at least one of said detected simultaneous user interaction with the plurality of computing nodes and the user includes data collected by sensors during said detected simultaneous user interaction with the plurality of computing nodes.

4. The method of claim 1, wherein the at least one data source associated with at least one of said detected simultaneous user interaction with the plurality of computing nodes and the user includes at least one of electronic communications associated with said detected simultaneous user interaction with the plurality of computing nodes and a schedule of the user.

5. The method of claim 1, wherein the determining of the computing node prioritization strategy includes calculating an interaction score for said detected simultaneous user interaction with at least one of the plurality of computing nodes.

6. The method of claim 1, wherein the at least limiting the future user interaction with the at least one of the plurality of computing nodes based on the determined computing node prioritization strategy includes preventing the user from interacting with the at least one of the plurality of computing nodes while the user is interacting with others of the plurality of computing nodes.

7. A system for managing a multi-channel computing environment comprising:
    at least one processor that
        detects a user simultaneously interacting with a plurality of computing nodes, wherein each of the plurality of computing nodes comprises a computer program application different from one another such that the detecting identifies the user as simultaneously physically interacting with a plurality of differing computer program applications notwithstanding whether any of the plurality of differing computer program applications are executed on a same computing device;
        determines a computing node prioritization strategy for future user interaction with at least one of the plurality of computing nodes based on at least one data source associated with at least one of said detected simultaneous user interaction with the plurality of computing nodes and the user; and
        at least limits the future user interaction with at least one of the plurality of computing nodes based on the determined computing node prioritization strategy.

8. The system of claim 7, wherein the determining of the computing node prioritization strategy is performed utilizing a cognitive analysis.

9. The system of claim 7, wherein the at least one data source associated with at least one of said detected simultaneous user interaction with the plurality of computing nodes and the user includes data collected by sensors during said detected simultaneous user interaction with the plurality of computing nodes.

10. The system of claim 7, wherein the at least one data source associated with at least one of said detected simultaneous user interaction with the plurality of computing nodes and the user includes at least one of electronic communications associated with said detected simultaneous user interaction with the plurality of computing nodes and a schedule of the user.

11. The system of claim 7, wherein the determining of the computing node prioritization strategy includes calculating an interaction score for said detected simultaneous user interaction with at least one of the plurality of computing nodes.

12. The system of claim 7, wherein the at least limiting the future user interaction with the at least one of the plurality of computing nodes based on the determined computing node prioritization strategy includes preventing the user from interacting with the at least one of the plurality of computing nodes while the user is interacting with others of the plurality of computing nodes.

13. A computer program product for managing a multi-channel computing environment by one or more processors, the computer program product comprising a non-transitory computer-readable storage medium having computer-readable program code portions stored therein, the computer-readable program code portions comprising:
   an executable portion that detects a user simultaneously interacting with a plurality of computing nodes, wherein each of the plurality of computing nodes comprises a computer program application different from one another such that the detecting identifies the user as simultaneously physically interacting with a plurality of differing computer program applications notwithstanding whether any of the plurality of differing computer program applications are executed on a same computing device;
   an executable portion that determines a computing node prioritization strategy for future user interaction with at least one of the plurality of computing nodes based on at least one data source associated with at least one of said detected simultaneous user interaction with the plurality of computing nodes and the user; and
   an executable portion that at least limits the future user interaction with at least one of the plurality of computing nodes based on the determined computing node prioritization strategy.

14. The computer program product of claim 13, wherein the determining of the computing node prioritization strategy is performed utilizing a cognitive analysis.

15. The computer program product of claim 13, wherein the at least one data source associated with at least one of said detected simultaneous user interaction with the plurality of computing nodes and the user includes data collected by sensors during said detected simultaneous user interaction with the plurality of computing nodes.

16. The computer program product of claim 13, wherein the at least one data source associated with at least one of said detected simultaneous user interaction with the plurality of computing nodes and the user includes at least one of electronic communications associated with said detected simultaneous user interaction with the plurality of computing nodes and a schedule of the user.

17. The computer program product of claim 13, wherein the determining of the computing node prioritization strategy includes calculating an interaction score for said detected simultaneous user interaction with at least one of the plurality of computing nodes.

18. The computer program product of claim 13, wherein the at least limiting the future user interaction with the at least one of the plurality of computing nodes based on the determined computing node prioritization strategy includes preventing the user from interacting with the at least one of the plurality of computing nodes while the user is interacting with others of the plurality of computing nodes.

* * * * *